United States Patent
Lo et al.

(10) Patent No.: US 8,057,878 B2
(45) Date of Patent: Nov. 15, 2011

(54) METHOD TO CONNECT BAFFLE AND INTERNAL STRUCTURE TO THE OUTER-SHELL OF SLEEPING BAG, INSULATED JACKET AND TENT

(75) Inventors: Alfred Lo, Overland Park, KS (US); Taher Abujoudeh, Lee's Summit, MO (US)

(73) Assignee: BHA Group, Inc., Kansas City, MO (US)

( * ) Notice: Subject to any disclaimer, the term of this patent is extended or adjusted under 35 U.S.C. 154(b) by 368 days.

(21) Appl. No.: 12/247,582

(22) Filed: Oct. 8, 2008

(65) Prior Publication Data

US 2010/0086730 A1    Apr. 8, 2010

(51) Int. Cl.
*B32B 3/28* (2006.01)
(52) U.S. Cl. .......... 428/116; 428/102; 428/117; 442/86; 442/239; 442/246; 442/255; 442/318; 442/319; 442/326; 442/381; 5/413 R; 156/60; 135/115
(58) Field of Classification Search .................... 442/86, 442/239, 246, 255, 318, 319, 326, 381; 5/413 R; 428/102, 116, 117; 156/60; 135/115
See application file for complete search history.

(56) References Cited

U.S. PATENT DOCUMENTS

| | | | | |
|---|---|---|---|---|
| 3,805,720 A * | 4/1974 | Hunt | .............................. | 112/420 |
| 3,857,125 A * | 12/1974 | Hunt | .............................. | 5/413 R |
| 3,988,791 A * | 11/1976 | Simon | ............................ | 5/413 R |
| 5,620,545 A * | 4/1997 | Braun et al. | ................... | 156/205 |
| 7,094,714 B2 | 8/2006 | Lap et al. | | |
| 7,386,898 B1 | 6/2008 | Brun | | |
| 2009/0136718 A1 | 5/2009 | Dacey et al. | | |

FOREIGN PATENT DOCUMENTS
WO   WO 0112029 A1 *  2/2001

* cited by examiner

*Primary Examiner* — Andrew Piziali
(74) *Attorney, Agent, or Firm* — Pearne & Gordon LLP

(57) ABSTRACT

A waterproof, insulated multi-layer fabric structure is described, including a first and second layer to bound an interior volume. A baffle layer is located in the bounded volume and undulates between the first layer and second layer. The baffle layer is directly attached to the first layer. Adhesive tape portions are attached to the second layer to eliminate the need of stitching through the second layer, improving the structure's waterproof qualities. The baffle layer is attached to the adhesive tape portions which extend from the second layer. A method for manufacturing the multi-layer structure is also described.

10 Claims, 2 Drawing Sheets

METHOD TO CONNECT BAFFLE AND INTERNAL STRUCTURE TO THE OUTER-SHELL OF SLEEPING BAG, INSULATED JACKET AND TENT

FIELD OF THE INVENTION

The present invention relates generally to multi-layer fabric structures and methods of manufacturing those fabrics structure, and more particularly, to waterproof multi-layer fabrics structure and methods of manufacturing multi-layer fabrics structure.

BACKGROUND OF THE INVENTION

Human activities in the outdoors include camping, hiking, viewing sporting events, and many other possibilities. It is desirable to have waterproof and insulating fabric structures to make those activities more comfortable for people. Conventional fabrics and methods have been created with many styles and various purposes using waterproof barriers and insulating layers. For example, conventional fabrics and methods frequently employ multiple-layer fabrics in the construction of sleeping bags, jackets, tents, and other products. Two considerations for waterproof, insulating fabric structure are an impervious exterior layer and internal compartments to restrict the movement of insulation.

With some fabric structures, the interior components are sewn to the exterior layer. This process creates needle holes through the exterior layer and lessens the waterproof quality of the exterior layer. Furthermore, water that gains access to the interior of the fabric structure will reduce the insulating capacity of the interior materials. Still further, the stitches that go to the exterior of the structure are subject to wear, and may break, enabling the interior barrier structures to lose effectiveness.

Some methods of manufacturing waterproof and insulating fabric assemblies use weldable material or attachment strips to fasten partition walls to the exterior layer of the assembly. The present invention improves upon prior designs by providing attachment on both sides of the partition wall attachment locations to the exterior layer rather than only one side. Other improvements include production efficiency and product quality.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one example aspect, the present invention provides a multi-layer fabric structure includes an extending first layer and an extending second layer. The extending second layer is spaced from the first layer. The extending first layer and the extending second layer bound an interior volume. A baffle layer is located within the bounded interior volume, and the baffle layer has a series of undulations. The undulations include directional changes so that the baffle layer alternately extends toward the first layer and the second layer. The baffle layer is directly attached to the first layer at undulation locations of the baffle layer that extend toward the first layer. A series of adhesive tape portions are located within the bounded interior volume at each undulation of the baffle layer that extends toward the second layer. Each adhesive tape portion is secured to the second layer and extends from the second layer. The baffle layer is secured to the adhesive tape portions at the undulation locations of the baffle layer that extend toward the second layer and are spaced from the second layer.

In accordance with another example aspect, the present invention provides a method of making a multi-layer fabric structure includes the steps of providing an extending first layer. The method further includes providing an extending second layer spaced from the first layer, bounding an interior volume between the first and second layers. The method further includes providing a baffle layer for location within the interior volume. The method further includes providing a series of adhesive tape portions for location within the interior volume. The method further includes orienting the baffle layer within the interior volume to have a series of undulations that include directional changes to alternately extend toward the first layer and the second layer. The method further includes directly attaching the baffle layer to the first layer at undulation locations of the baffle layer that extend toward the first layer. The method further includes locating each tape portion within the interior volume and at an undulation location of the baffle layer that extends toward the second layer. The method further includes securing each tape portion to the second layer with the tape portion extending from the second layer. The method further includes securing the baffle layer to the tape portions at the undulation locations of the baffle layer that extend toward the second layer and are spaced from the second layer.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Figure 1:
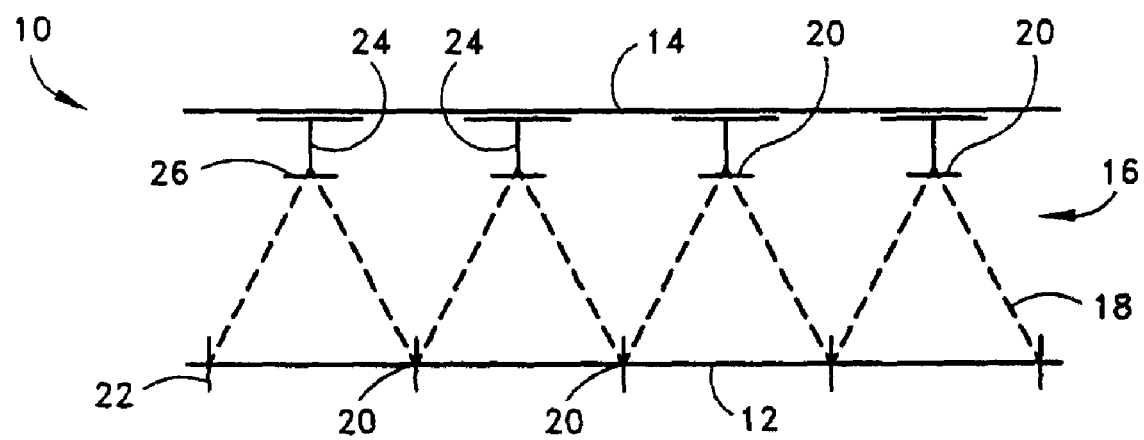
FIG. 1 is a sectional view of the multi-layer fabric structure incorporating example aspects of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Turning to FIG. 1, an example multi-layer fabric structure 10 is shown in accordance with one aspect of the subject invention. The multi-layer fabric structure 10 includes an extending first layer 12 and an extending second layer 14 spaced from the first layer 12. As can be appreciated, the first layer 12 and the second layer may each, separately be made of any desired material that has any desired property. Some example properties include water/moisture repellency/proofness, air permeability, wear durability, dirt repellency/washability, softness, warmth/heat retention, etc. Also, the first layer 12 and second layer 14 may be natural or man-made materials. The first layer 12 and second layer 14 bound an interior volume 16.

A baffle layer 18 is located within the interior volume 16. The baffle layer 18 may also be made of any desired material that has any desired property. Also, the baffle layer 18 may be composed of natural or man-made materials. The baffle layer 18 has a series of undulations 20 that include directional changes to alternately extend toward the first layer 12 and the second layer 14. The schematic illustration shows the undulations 20 as being a series of "V" shapes with straight segments forming the "V" shapes. However, it is to be appreciated that the undulations 20 may have other shapes such as "U" shaped undulations. In the shown example, the baffle layer 18 is directly attached to the first layer 12 at undulation locations of the baffle layer that extend toward the first layer. In the shown example, the direct attachment 22 is schematically shown as a line through the first layer 12 and the baffle layer 18. The direct attachment 22 may be a sewn filament of various materials or may have a variety of other structures such as adhesive, hot seam weld, or any other attachment means as are known in the art.

A series of adhesive tape portions 24 are located within the interior volume 16. Each adhesive tape portion 24 is located at an undulation location of the baffle layer 18 that extends toward the second layer 14. The adhesive tape portions 24 are attached to the second layer 14 and extend from the second layer. This fastening method does not require penetrations through the second layer 14 as exists in some fastening techniques such as sewn filament. The baffle layer 18 is directly attached to the adhesive tape portions 24. In the shown example, the direct attachment 26 is schematically drawn as a line through the adhesive tape portion 24 and the baffle layer 18. The direct attachment 26 may be a sewn filament of various materials or may have a variety of other structures such as adhesive, hot seam weld, or any other attachment means as are known in the art.

It is to be appreciated that the first layer 12 and second layer 14 may have any desired size of area and that the baffle layer 18 may extend for any amount of the area of the first and/or second layers. Also, it is to be appreciated that the view of FIG. 1 is along the elongation of the adhesive tape portions 24 may have any desired length.

Figure 2:
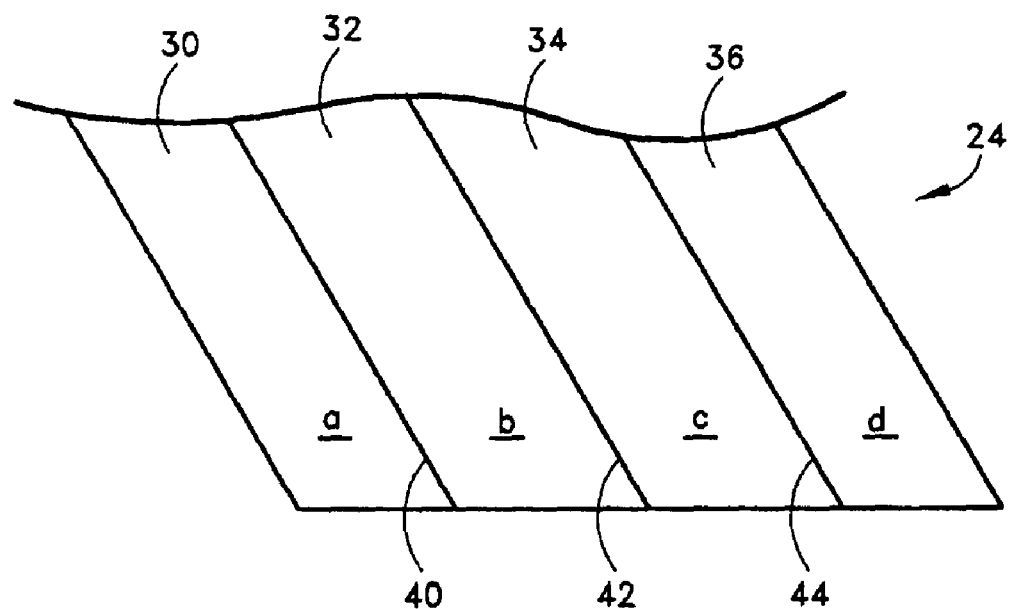
FIG. 2 is a top view of the adhesive tape portion.

Turning now to FIG. 2, an example adhesive tape portion 24 is shown with four portions 30, 32, 34, 36 of relatively equal areas, however, it is to be understood that the areas may be of different sizes from the shown example. Of course, the length of the tape may be any desired length. In the shown example, the areas are separated by three straight fold lines 40, 42, 44. The fold lines 40, 42, 44 may be provided to enable the adhesive tape portion 24 to fold into a "T"-shaped cross section. However, it is to be appreciated that other shapes can be utilized such as "TT" shaped cross section. It should be appreciated that the adhesive tape portion 24 may have a variety of fold configurations, fold shapes, fold placements, etc. to attain the same result. Adhesive is located on the viewable (or top) side of the adhesive tape portion 24.

Figure 3:
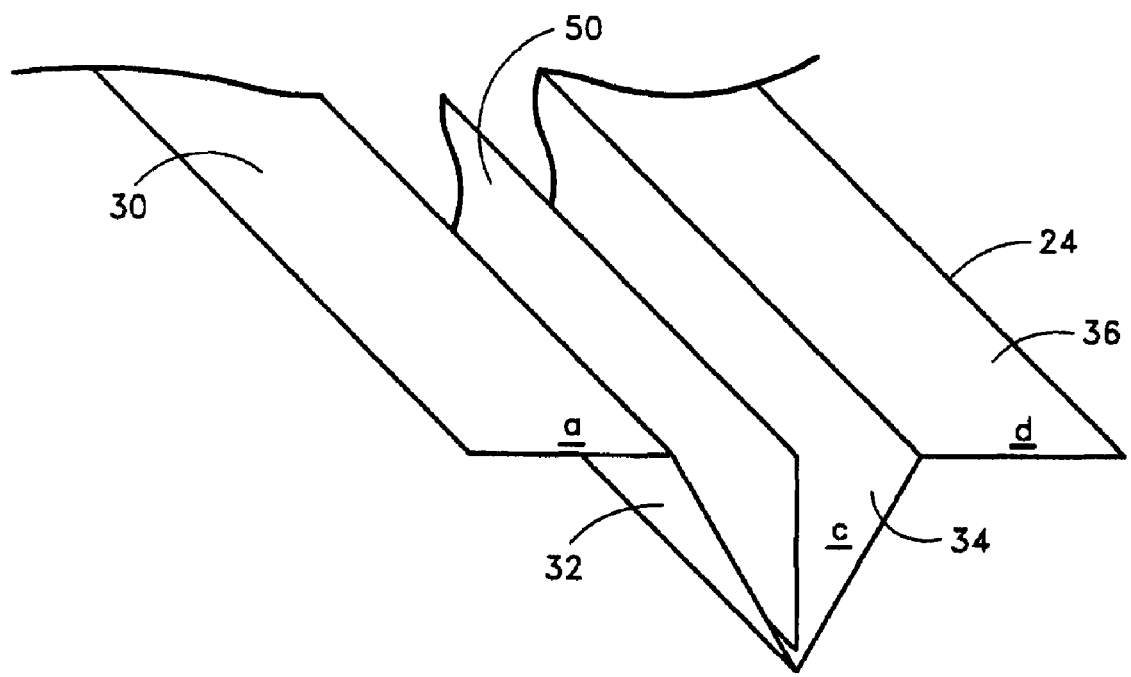
FIG. 3 is a perspective view the adhesive tape portion as it is being folded around the mesh-type fabric.

Turning now to FIG. 3, an example adhesive tape portion 24 is shown as it is being folded into a "T"-shaped cross section. It is to be understood that other folded shapes may be used. In the shown example, a mesh-type or any other type fabric 50 is inserted between the central two portions 32, 34 of the adhesive tape portion 24 and is sandwiched by the adhesive tape portion. The mesh-type fabric 50 can provide increased strength, durability, stiffness, or the like. Surface a and surface d adhere to the second layer 14 and form a direct attachment that does not require any penetration through the second layer as exists in stitched filaments. Surface b and surface c adhere to the other of the first side or the second side of the mesh-type fabric 50.

Figure 4:
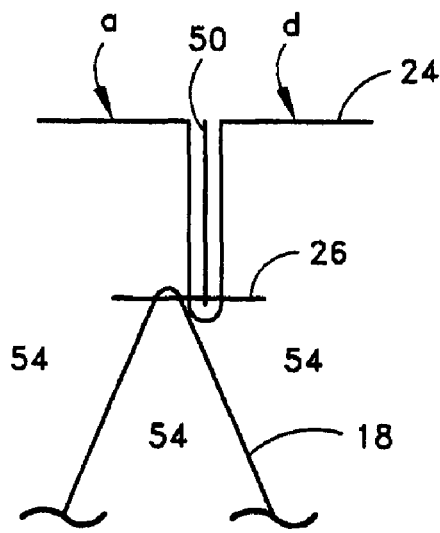
FIG. 4 is a sectional view of the adhesive tape portion after it has been folded and secured to the baffle layer.

Turning now to FIG. 4, an example adhesive tape portion 24 is shown after it has been folded together. The baffle layer 18 is directly attached to the adhesive tape portion 24 at undulation locations of the baffle layer that extend toward the second layer 14. In the shown example, the direct attachment 26 is schematically drawn as a line through the baffle layer 18 and the adhesive tape portion 24. The direct attachment 26 may be a sewn filament of various materials or may have a variety of other structures such as adhesive, hot seam weld, or any other attachment means as are known in the art. Attachment of the baffle layer 18 to the first layer 12 in combination with the attachment of the baffle layer to the adhesive tape portion 24 which is in-turn attached to the second layer 14 form a plurality of pockets 54 within the multi-layer fabric structure 10.

The multi-layer fabric structure 10 can further include insulating material located within the bounded interior volume 16. The insulating material is within the undulations 20 of the baffle layer 18 with the baffle layer inhibiting some movement of the insulating material.

The series of undulations 20 of the baffle layer 18 can further be configured as a general zig-zag and/or other type pattern that alternately extends toward the first layer 12 and the second layer 14 with changes of direction being at the undulations of the baffle layer.

The multi-layer fabric structure 10 can be a portion of a sleeping bag, a portion of an article of clothing, a portion of a tent, or other item constructed of pliable material which may benefit from the properties of the multi-layer fabric structure.

An example method of making a multi-layer fabric structure 10 will now be described. As shown in FIG. 1, the extending first layer 12 is provided, as is an extending second layer 14, which is spaced from the first layer 12. An interior volume 16 is bounded by the first layer 12 and the second layer 14. A baffle layer 18 is provided within the interior volume 16. A series of adhesive tape portions 24 are provided within the interior volume 16.

The baffle layer 18 is oriented within the interior volume 16 so as to provide a series of undulations 20 that include directional changes to alternately extend toward the first layer 12 and second layer 14. The baffle layer 18 is directly attached to the first layer 12 at undulation locations of the baffle layer 18 that extend toward the first layer. Each adhesive tape portion 24 is located within the interior volume 16 and at an undulation location of the baffle layer 18 that extends toward the second layer 14. Each adhesive tape portion 24 is secured to the second layer 14 with the adhesive tape portion extending from the second layer. The baffle layer 18 is secured to the adhesive tape portions at the undulation locations of the baffle layer that extend toward the second layer 14 and spaced from the second layer.

In one example, the multi-layer fabric structure 10 has a first layer 12 of fabric and a second layer 14 of waterproof fabric spaced a distance apart. The interior of the space is occupied by a baffle layer 18 which is directly attached to the first layer 12 with a sewn thread. A plurality of adhesive tape portions 24 are directly attached to one side of the second layer 14. The baffle layer 18 is directly attached to the adhesive tape portions 24 and mesh-type fabric 50 with a sewn thread. The direct attachment 22 for the baffle layer 18 undulations 20 to the first layer 12 and the adhesive tape portions 24 extending from the second layer 14 can alternatively include additional adhesive, hot seam welding, or any other attachment as is known in the art. The positioning and attachment of the baffle layer 18 undulations forms a zig-zag and/or other type pattern when viewed in cross-section. The chambers created by the undulating baffle layer 18 are filled with insulating material such as down or synthetic fibers.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A multi-layer fabric structure including:
   an extending first layer;
   an extending second layer spaced from the first layer, the first and second layers bounding an interior volume;
   a baffle layer located within the bounded volume, the baffle layer having a series of undulations that include directional changes to alternately extend toward the first layer and the second layer, the baffle layer being directly attached to the first layer at undulation locations of the baffle layer that extend toward the first layer; and
   a series of adhesive tape portions located within the interior volume, each tape portion comprising a length of material with adhesive backing on one of its sides, each tape portion being located at an undulation location of the baffle layer that extends toward the second layer, each tape portion being folded into a T-shaped structure so as to provide a baffle layer securing portion and two second layer securing portions, the baffle layer securing portion having a double thickness of material with adhesive backing on one of its sides, each second layer securing portion being secured to the second layer so that the baffle layer securing portion extends from the second layer and is supported by the two second layer securing portions, the baffle layer being secured to the baffle layer securing portion at the undulation locations of the baffle layer that extend toward the second layer and spaced from the second layer.

2. A fabric structure as set forth in claim 1 including insulating material located within the interior volume, the insulating material is within the undulations of the baffle layer with the baffle layer inhibiting some movement of the insulating layer.

3. A fabric structure as set forth in claim 1, wherein series of undulations of the baffle layer are configured as a general zig-zag pattern that alternately extends toward the first layer and the second layer with changes of direction being at the undulations of the baffle layer.

4. A fabric structure as set forth in claim 1, wherein the direct attachment of the baffle layer to the first layer is sewn.

5. A fabric structure as set forth in claim 1, wherein the securing of the second layer securing portions to the second layer provides attachment to the second layer without penetration of the second layer.

6. A fabric structure as set forth in claim 1, wherein the fabric structure is a portion of a sleeping bag.

7. A fabric structure as set forth in claim 1, wherein the fabric structure is a portion of an article of clothing.

8. A fabric structure as set forth in claim 1, wherein the fabric structure is a portion of a tent.

9. A fabric structure as set forth in claim 1, including a separate fabric located between the double thickness of material with adhesive backing on one of its sides.

10. A method of making a multi-layer fabric structure, the method including:
    providing an extending first layer;
    providing an extending second layer to be spaced from the first layer, with an interior volume to be bounded by the first and second layers;
    providing a baffle layer for location within the interior volume;
    providing a series of adhesive tape portions for location within the interior volume;
    orienting the baffle layer within the interior volume to have a series of undulations that include directional changes to alternately extend toward the first layer and the second layer;
    directly attaching the baffle layer to the first layer at undulation locations of the baffle layer that extend toward the first layer;
    folding each tape portion into a T-shaped structure so as to provide a baffle layer securing portion and two second layer securing portions, the baffle layer securing portion having a double thickness of material with adhesive backing on one of its sides;
    locating each tape portion within the interior volume and at an undulation location of the baffle layer that extends toward the second layer;
    securing each second layer securing portion to the second layer so that the baffle layer securing portion extends from the second layer and is supported by two second layer securing portions; and
    securing the baffle layer to the baffle layer securing portion at the undulation locations of the baffle layer that extend toward the second layer and spaced from the second layer.

* * * * *